United States Patent [19]
Fields et al.

[11] Patent Number: 6,064,325
[45] Date of Patent: May 16, 2000

[54] FREQUENCY MODULATION-BASED FOLDING OPTICAL ANALOG-TO-DIGITAL CONVERTER

[75] Inventors: Richard A. Fields, Redondo Beach; David L. Rollins, Hawthorne; Stephen R. Perkins; Eric L. Upton, both of Redondo Beach; Elizabeth T. Kunkee, Manhattan Beach; Lawrence J. Lembo; Juan C. Carillo, Jr., both of Torrance; Mark Kintis, Manhattan Beach, all of Calif.

[73] Assignee: TRW Inc., Redondo Beach, Calif.

[21] Appl. No.: 09/133,037

[22] Filed: Aug. 11, 1998

[51] Int. Cl.⁷ ............................................... H03M 1/00
[52] U.S. Cl. .................................. 341/137; 341/155
[58] Field of Search .................................. 341/137, 155; 359/237, 325

[56] References Cited

U.S. PATENT DOCUMENTS

| | | | |
|---|---|---|---|
| 3,778,718 | 12/1973 | Bass et al. | 455/102 |
| 4,164,714 | 8/1979 | Swanson | 330/10 |
| 5,555,096 | 9/1996 | Yoo | 358/310 |
| 5,675,428 | 10/1997 | Henmi | 359/161 |

*Primary Examiner*—Brian Young
*Assistant Examiner*—Peguy JeanPierre
*Attorney, Agent, or Firm*—Michael S. Yatsko; Connie M. Thousand

[57] ABSTRACT

A frequency modulation-based optical analog-to-digital converter utilizes a downward-folding, successive approximation approach. A series of stages is utilized to generate bits in the digital signal. In each stage, complementary low and high bandpass filters collectively cover a bandpass frequency range from a low frequency to a high frequency. The high frequency filtered signal from the high bandpass filter is observed to obtain a bit in the digital word. By performing the folding operations in the frequency domain, the converter avoids the difficult task of optical power subtraction, relying instead on frequency down-conversions. The high frequency filtered signal passed by the high bandpass filter is then downconverted and added to the low pass filter signal to generate a modulated signal for the next stage.

19 Claims, 2 Drawing Sheets

FREQUENCY MODULATION-BASED FOLDING OPTICAL ANALOG-TO-DIGITAL CONVERTER

BACKGROUND OF THE INVENTION

The present invention relates generally to optical systems, and more particularly to optical analog-to-digital converters.

Rapid advances in technology, particularly greater processing speeds, increased channel bandwidths and improved transmission reliability, have resulted in a steadily growing focus on the optical domain and the vast potential therein. Being a relatively new area compared with electrical, radio frequency (RF)-based processing, existing optical technology available in many areas is immature at best. In particular, the promise of high-speed, large-bandwidth processing advances with digital optics has been hampered by the lack of or the immaturity of many basic technologies taken for granted in the RF domain.

The optical analog-to-digital converter is one such technology where technological advances are desired. In particular, current digital optical systems rely on digitization in the electrical/RF domain, requiring slow, lossy, noisy conversions back and forth between the optical and RF domains. Furthermore, present optical analog-to-digital converters utilize a "downward-folding" successive approximation approach to test the sampled analog signal against a specific threshold. If the sample is below threshold, the bit is set to "low" and the sample is passed directly to the next bit stage. If the signal amplitude is above the threshold, the bit is set to "high" and the system goes about reducing the sample amplitude by the threshold value before passing it on to the next bit stage. Each successive stage tests the sample against thresholds growing closer and closer to zero. The algorithm for such a converter is difficult to implement in an optical regime because simple, robust methods of subtracting optical signals from one another have not been adequately developed.

What is needed therefore is a device which would convert an optical analog signal to an optical digital signal with little or no reliance on RF technology, thereby reducing system complexity and allowing for high speed, large bandwidth processing advances.

SUMMARY OF THE INVENTION

The preceding and other shortcomings of the prior art are addressed and overcome by the present invention which provides, in a first aspect, an apparatus for converting an analog signal into a digital signal, including a means for generating an optical carrier signal, a means for frequency modulating the optical carrier signal with the analog signal to generate a modulated signal and a series of analog-to-digital stages, wherein each analog-to-digital stage generates a digital bit in the digital signal. Each series of analog-to-digital stages includes a means for filtering the modulated signal within first and second passbands and generating first and second filtered signals in response thereto, a means for generating a first binary signal when the second filtered signal falls within the second passband and a second binary signal when the second filtered signal falls outside of the second passband, means for decreasing the frequency of the second filtered signal to generate a downshifted signal and a means for combining the first filtered signal and the downshifted signal to generate the modulated signal at a lower frequency.

In another aspect, the present invention provides a method for converting an analog signal into a digital signal, including the steps of generating an optical carrier signal, frequency modulating the optical carrier signal with the analog signal to generate a modulated signal and generating a digital bit in a series of steps. Each series includes the steps of filtering the modulated signal within first and second passbands and generating first and second filtered signals in response thereto, generating a first binary signal when the second filtered signal falls within the second passband and a second binary signal when the second filtered signal falls outside of the second passband, decreasing the frequency of the second filtered signal to generate a downshifted signal and combining the first filtered signal and the downshifted signal to generate the modulated signal at a lower frequency.

The foregoing and additional features and advantages of this invention will become apparent from the detailed description and accompanying drawing figures below. In the figures and the written description, numerals indicate the various features of the invention, like numerals referring to like features throughout both the drawing figures and the written description.

DETAILED DESCRIPTION OF THE PREFERRED EMBODIMENTS

Figure 1:
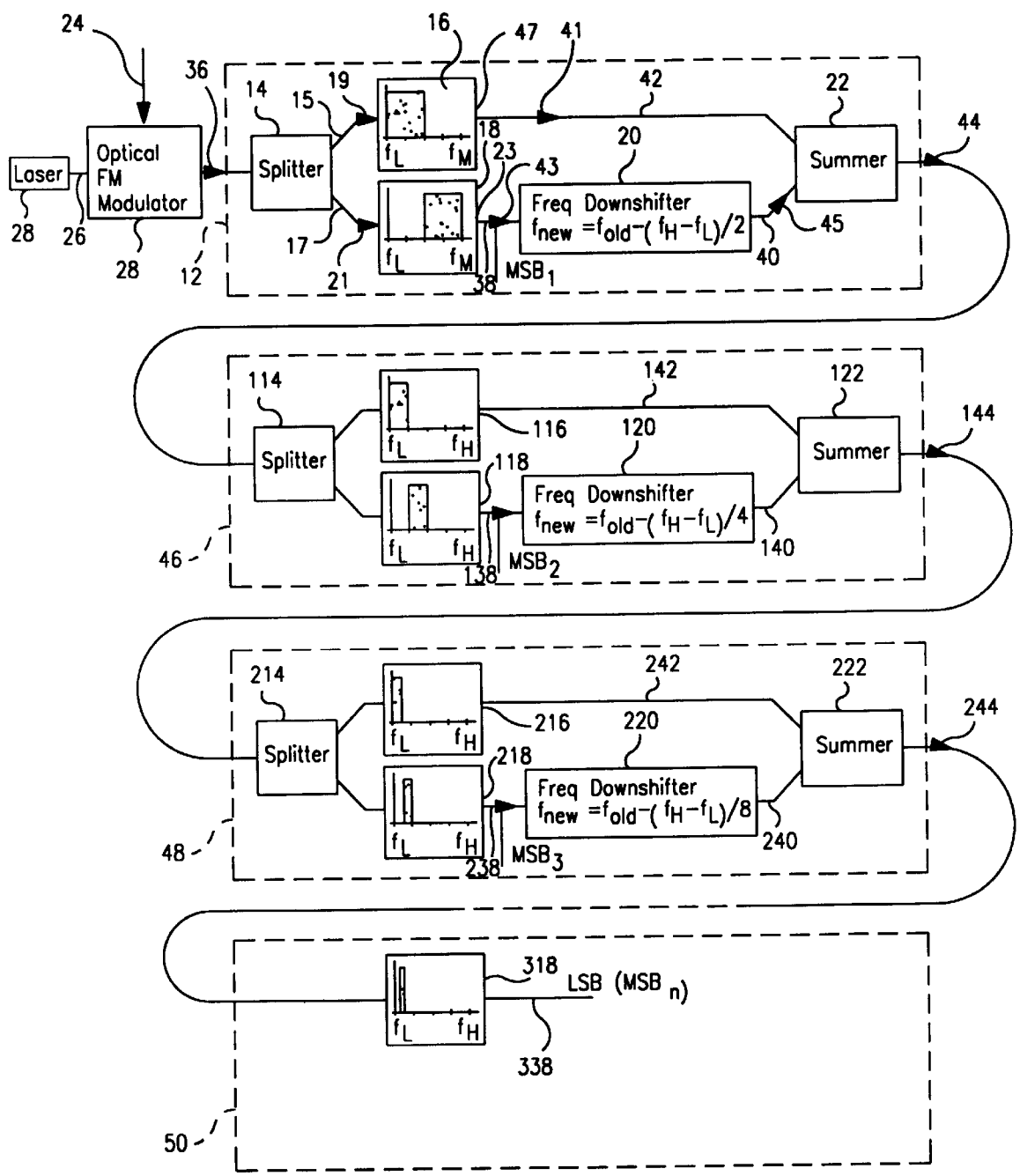
FIG. 1 is a block diagram of a frequency modulation-based optical analog-to-digital converter utilizing a downward-folding successive approximation approach in accordance with a preferred embodiment of the invention.

Referring to FIG. 1, a frequency modulation-based optical analog-to-digital converter 10 utilizing a downward-folding, successive approximation approach is illustrated. By performing the downward folding operations in the frequency domain, the present invention avoids the difficult task of optical power subtraction, relying instead on frequency down-conversions. The present invention is particularly useful in high speed digital optical links. By digitizing in the optical realm, higher bit rates can be achieved, lower noise levels can be realized and system complexity can be reduced.

As is illustrated in FIG. 1, the optical analog-to-digital converter 10 includes successive stages 12, 46, 48 each of which includes a splitter 14, 114, 214, first and second filters 16, 116, 216 and 18, 118, 218 respectively, frequency downshifter 20, 120, 220 and summer 22, 122, 222. An analog RF input signal 24 is externally modulated onto the carrier output 26 from a laser 28 utilizing an optical frequency modulated (FM) modulator 30. Alternatively, the analog RF input signal 24 is modulated onto the carrier output 26 by internal modulation of the laser 28. The optical FM modulator 30 can include any such internal or external modulator respectively which is newly developed or well known in the art.

Figure 2:
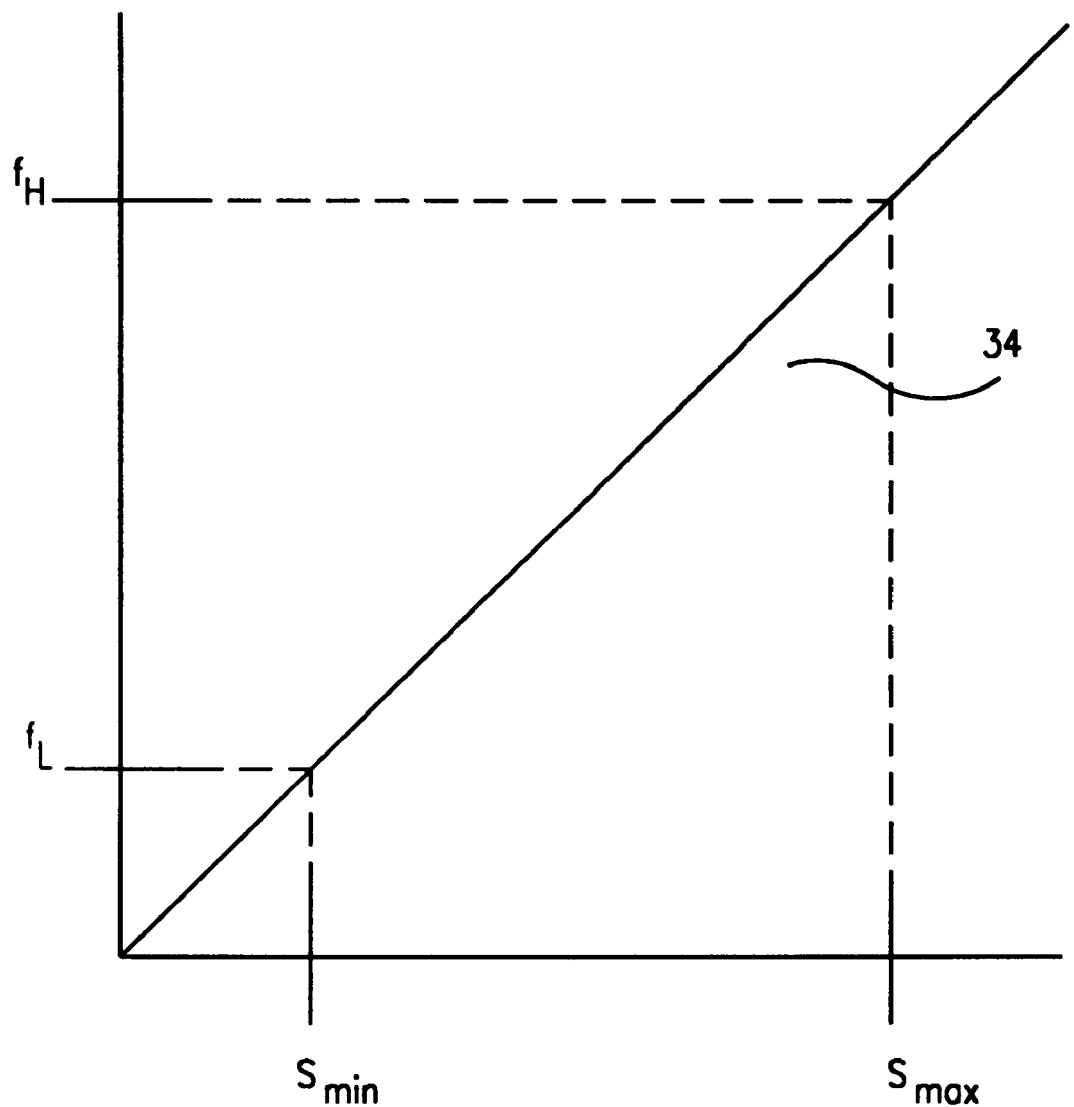
FIG. 2 is a graph of amplitude to frequency mapping for the optical analog-to-digital converter illustrated in FIG. 1.

The analog RF input signal 24 to be digitized is thus frequency modulated onto an optical carrier 36. Referring to FIG. 2, a graph 32 of the preferred amplitude to frequency mapping 34 for the optically modulated signal 36 generated by the modulator 30 is illustrated. The frequency mapping 34 is carried out such that the minimum signal amplitude, $S_{min}$, corresponds to the lower frequency band edge, $f_L$, and the maximum signal amplitude, $S_{max}$, corresponds to the upper frequency band edge, $f_H$. Intermediate signal amplitudes map linearly to the frequencies between $f_L$ and $f_H$. The signal 36 generated by the FM modulator 30 will therefore be a single tone whose frequency travels back and forth over the range of $f_L$ to $f_H$ according to the amplitude of the RF input signal 24.

The amplitude-to-frequency mapping 34 shown in FIG. 2 would be used for linear quantization, the preferred implementation. In additional embodiments non-linear quantizations can be easily implemented by making the frequency mapping 34 of FIG. 2 non-linear.

Referring to FIG. 1, the optically modulated signal 36 enters the first stage 12 where it is applied to an 1×2 optical signal splitter 14 which divides the modulated signal 36 into equal first and second intermediate signals 19 and 21 which are output to first and second output paths 15 and 17 respectively. The optical splitter 14 may be selected from any optical device which can divide an input optical signal and output it onto at least two output paths 19 and 21. The complementary first and second filters 16 and 18 collectively cover a bandpass frequency range from a low frequency $f_L$ to a high frequency $f_H$. The first filter 16 passes intermediate signals 19 within the lower frequency passband $f_L$ to $(f_H + f_L)/2$ outputting a low frequency filtered signal 41 at the output 47 of the low bandpass filter 16. Correspondingly, the second filter 18 passes intermediate signals 21 within the upper frequency passband $(f_H + f_L)/2$ to $f_H$ outputting a high frequency filtered signal 43 at the output 23 of the high bandpass filter 18. The high frequency filtered signal 43 at the output 23 of the high bandpass filter 18 is the MSB or $B_1$. In particular, when the second intermediate signal 21 falls within the passband of the second filter 18, the $MSB_n$ is set to "1", corresponding to a high state. Conversely, when the second intermediate signal 21 falls outside of the passband of the second filter 18, there will be no signal power at the output 23 and the $MSB_n$ is set to "0", corresponding to a low state. Because the second intermediate signal 21 is a single tone, the second intermediate signal 21 will always fall either entirely inside the passband region, or entirely outside, never both.

The low frequency filtered signal 41, if any, is output from the low pass filter 16 onto the first intermediate path 42 and is passed directly to the summer 22 with no frequency adjustments.

The high frequency filtered signal 43, if any, is output from the second filter 18 onto the second intermediate path 38 and is applied to the frequency downshifter 20, which downconverts the high frequency filtered signal 43 by $(f_H - f_L)/2$ to generate a downshifted signal 45 in accordance with the equation $$f_{new} = f_{old} - (f_H - f_L)/2 \qquad (1)$$

such that the downshifted signal 45 is in the lower half of the frequency range $f_L$ to $f_H$. The downshifted signal 45 is output from the downshifter 20 onto the third intermediate path 40 and passed to the summer 22.

Because the input signal 36 to the first stage 12 is a single tone, and the stage's two filters 16 and 18 are complementary, the first and second intermediate signals 19 and 21 respectively will fall into the passband of only one of the two filters 16 or 18. Each intermediate signal 19 and 21 will only be passed on if it falls in a filter passband, otherwise it is rejected. Therefore, one of the two complementary filters 16 or 18 will always pass one of the first or second intermediate signals 19 or 21 while the other complementary filter 16 or 18 will always block one of the first or second intermediate signals 19 or 21. Although the first and second intermediate signals 19 and 21 appear on both the first and second intermediate paths 15 and 17 before reaching the filters 16 and 18 respectively, after the filters 16 and 18 there is necessarily a signal 41 or 43 on one and only one of the two paths 42 or 38 respectively. The path 42 or 38 carrying the signal 41 or 43 respectively at any given time depends on the frequency of the tone at that time.

The path 42 from the low bandpass filter 16 and the path 40 from the high bandpass filter 18 and downconverter 20 are joined at the 2×1 optical summer 22. The 2×1 optical summer 22 may be any optical component which combines signals from two optical waveguides into a single optical medium. In one embodiment, the device chosen for the splitter 14 may be operated in reverse fashion such that the splitter 14 functions as a summer 22.

Since the signal paths 40 and 42 are recombined at the end of the first stage 12, the first stage downshifted output 44 is constrained therefore to lie within the bottom half of the frequency range. In accordance with the present invention, the first stage downshifted output 44 can then be amplified, if needed, and passed to the second stage 46. The second stage 46 is similar to the first stage 12, except that the first and second filters 116 and 118 distinguish between the upper and lower halves of the new, reduced frequency range, $f_L$ to $(f_L + f_H)/2$, the frequency downshifter 120 operates to down-convert the signal 138 in accordance with the equation $$f_{new} = f_{old} - (f_H - f_L)/4 \qquad (2)$$

and the summer 122 outputs a signal 144 to the next stage splitter 214. The second stage 46 yields the second bit $B_2$ and has an output in the range of $f_L$ to $f_L + (f_L - f_H)/4$. Similarly, the third stage 48 is similar to the first and second stages 12 and 46, except that the first and second filters 216 and 218 distinguish between the upper and lower halves of the new, reduced frequency range, $f_L$ to $f_L + (f_L - f_H)/4$. The third stage 48 yields the third bit $B_3$ and has an output in the range of $f_L$ to $f_L + (f_L - f_H)/8$. Subsequent bits can be extracted by additional stages with finer and finer filters. In the last stage 50, the least significant bit (LSB) or $B_n$ can be derived. Multiple bits can thus be obtained by cascading additional stages.

The bits generated by each stage 12, 46, 48 and 50, which are taken out of the signals 38, 138, 238, and 338 coming out of the high frequency filters 18, 118, 218 and 318, can be processed and utilized as desired for each specific application. If a parallel bit output is desired, the bits can be used as is, or with appropriate time delays (not shown) to synchronize the bit output. If serial bit output is desired, the N bit paths can be combined into one path with an N×1 summer (not shown). Again, the synchronization of the bits can be achieved with properly implemented time-delays before the bits are combined in the N×1 summer.

The fully optical analog-to-digital converter 10 of the present invention is particularly useful in high speed digital links. By digitizing in the optical realm, higher bit rates can be achieved, lower noise levels can be realized and system complexity can be reduced.

It will be appreciated by persons skilled in the art that the present invention is not limited to what has been shown and described hereinabove, nor the dimensions of sizes of the physical implementation described immediately above. The scope of invention is limited solely by the claims which follow.

What is claimed is:

1. Apparatus for converting an analog signal into a digital signal, comprising:

means for generating an optical carrier signal;

means for frequency modulating said optical carrier signal with said analog RF signal to generate a modulated optical signal;

a plurality of frequency conversion stages each generating a digital bit in said digital signal and comprising:
  means for filtering said modulated optical signal within first and second passbands and generating first and second filtered optical signals in response thereto;
  means for generating a first binary signal when said second filtered optical signal is within said second passband and a second binary signal when said second filtered optical signal is outside of said second passband;
  means for decreasing said frequency of said second filtered optical signal to generate a downshifted optical signal; and
  means for combining said first filtered optical signal and said downshifted optical signal to generate said modulated signal at a lower frequency; and
means for combining said generated binary signal into a digital output.

2. The apparatus claimed in claim 1, wherein said means for generating an optical carrier signal is a laser source.

3. The apparatus claimed in claim 1, wherein said means for frequency modulating said optical carrier signal with said analog signal to generate a modulated signal is an optical FM modulator.

4. The apparatus claimed in claim 1, wherein said means for filtering said modulated signal within first and second passbands and generating first and second filtered signals in response thereto, further comprises:
  a first filter for providing said first passband and generating said first filtered signal; and
  a second filter for providing said second passband and generating said second filtered signal.

5. The apparatus claimed in claim 1, wherein said first passband is a low frequency passband.

6. The apparatus claimed in claim 5, wherein said second passband is a high frequency passband.

7. The apparatus claimed in claim 1, wherein said means for decreasing said frequency of said second filtered signal to generate a downshifted signal, further comprises:
  a frequency downshifter for decreasing said frequency of said second filtered signal to generate a downshifted signal.

8. The apparatus claimed in claim 1, wherein said frequency is decreased such that it falls within said first passband.

9. The apparatus claimed in claim 1, wherein said first binary signal is equal to zero and said second binary signal is equal to one.

10. The apparatus claimed in claim 1, wherein said first binary signal corresponds to a low state and said second binary signal corresponds to a high state.

11. The apparatus claimed in claim 1, wherein each subsequent stage in said series of stages produces a subsequent significant bit in said digital signal.

12. The apparatus claimed in claim 1, wherein said means for combining said first filtered signal and said downshifted signal to generate said modulated signal at a lower frequency, further comprises:
  a summer for combining said first filtered signal and said downshifted signal to generate said modulated signal at a lower frequency.

13. A method for converting an analog signal into a digital signal, comprising the steps of:
  generating an optical carrier signal;
  frequency modulating said optical carrier signal with said analog signal to generate a modulated signal; and
  generating a digital bit in a series of steps, where each series comprises the steps of:
    filtering said modulated signal within first and second passbands and generating first and second filtered signals in response thereto;
    generating a first binary signal when said second filtered signal falls within said second passband and a second binary signal when said second filtered signal falls outside of said second passband;
    decreasing said frequency of said second filtered signal to generate a downshifted signal; and
    combining said first filtered signal and said downshifted signal to generate said modulated signal at a lower frequency.

14. The method claimed in claim 13, wherein said step of filtering said modulated signal within first and second passbands and generating first and second filtered signals in response thereto, further comprises the steps of:
  passing said modulated signal through a first filter having said first passband and generating said first filtered signal; and
  passing said modulated signal through a second filter having said second passband and generating said second filtered signal.

15. The method claimed in claim 13, wherein said step of decreasing said frequency of said second filtered signal to generate a downshifted signal, further comprises the step of:
  frequency downshifting said frequency of said second filtered signal to generate a downshifted signal.

16. The method claimed in claim 15, wherein said step of frequency downshifting said frequency of said second filtered signal to generate a downshifted signal, further comprises the step of:
  decreasing said frequency of said second filtered signal such that said frequency falls within said first passband.

17. The method claimed in claim 13, wherein said step of generating a first binary signal when said second filtered signal falls within said second passband and a second binary signal when said second filtered signal falls outside of said second passband, further comprises the step of:
  generating said first binary signal equal to one when said second filtered signal falls within said second passband and a second binary signal equal to zero when said second filtered signal falls outside of said second passband.

18. The method claimed in claim 13, wherein said step of generating a first binary signal when said second filtered signal falls within said second passband and a second binary signal when said second filtered signal falls outside of said second passband, further comprises the step of:
  generating said first binary signal equal to a high state when said second filtered signal falls within said second passband and a second binary signal equal to a low state when said second filtered signal falls outside of said second passband.

19. The method claimed in claim 13, further comprising the step of:
  generating a subsequent significant bit in said digital signal in each subsequent series of steps.

* * * * *